US005083893A

United States Patent [19]

Yang

[11] Patent Number: 5,083,893

[45] Date of Patent: Jan. 28, 1992

[54] LIFTING DEVICE FOR WATER CONTAINER

[76] Inventor: Elmer C. Yang, 2717 E. Grove Ave., Orange, Calif. 92667

[21] Appl. No.: 610,775

[22] Filed: Nov. 8, 1990

[51] Int. Cl.[5] .............................................. B65G 65/24

[52] U.S. Cl. ...................................... 414/595; 187/10; 414/638

[58] Field of Search ............... 414/592, 595, 598, 603, 414/630, 637, 638, 674, 421, 422, 425; 187/10, 11

[56] References Cited

U.S. PATENT DOCUMENTS

| | | | |
|---|---|---|---|
| 782,925 | 2/1905 | Roseberry | 414/598 X |
| 943,786 | 12/1909 | Renner | 414/603 |
| 1,021,898 | 4/1912 | Shafto | 414/603 X |
| 1,504,034 | 8/1924 | Erwin | 414/598 |
| 1,682,078 | 8/1928 | Hanlen | 187/11 |
| 3,430,734 | 3/1969 | Embree | 187/10 |
| 3,476,212 | 11/1969 | Eakins | 187/10 X |
| 4,279,562 | 7/1981 | Cormier et al. | 414/598 |

*Primary Examiner*—David A. Bucci
*Attorney, Agent, or Firm*—Willie Krawitz

[57] ABSTRACT

A lifting device operated by a hand crank is described to hoist a weighted container, such as a bottle of drinking water, to the upper level of a water dispenser. When a container of water is placed on the device for upward movement, the device will prevent the weighted container from slipping downwardly against movement of the hand crank.

4 Claims, 2 Drawing Sheets

LIFTING DEVICE FOR WATER CONTAINER

BACKGROUND OF THE INVENTION

This invention relates to a new and improved device for elevating weighted containers, and more specifically to a device for elevating a container of liquid, such as bottled water, to adjacent the top of a drinking dispenser. The device employs a crank which enables the user to lift the bottle to near the top of the dispenser, and the device can then be lifted upwardly at one end without too much effort to move the container the remaining distance to the top of the dispenser. The container is then easily moved horizontally and stacked into the entry port of the dispenser.

Dispensers for water require the user to lift a bottle of water to the top of the dispenser, and invert the bottle over the entry port of the dispenser so that it can be filled. Since the filled bottle is quite heavy for most people, it is generally quite awkward to handle and difficult to lift the bottle and fit it into the water dispenser.

A simple and inexpensive device is desired to enable a single individual lift a container of liquid, such as a bottle of water to the top of the dispenser where it is then inverted over the dispenser port for use.

The device should be safe, particularly when the filled container is lifted, to avoid the possibility of the heavy container falling against the force of the lifting mechanism.

Also, it is desired to provide a lifting device which can be easily shipped, assembled, operated and stored.

THE INVENTION

According to the invention, a device is provided for lifting a container of liquid, such as a bottle of water, from floor level to the top of a dispenser, where it can then be moved horizontally to enable stacking on top of the dispenser.

The devices comprises an inverted V-shaped support stand, one side of the stand being supported by the water dispenser, and the other side of the stand functioning to provide a sliding support for raising the bottle of water. The sliding support comprises twin parallel pipe tracks along which the sliding support moves, and which can rotate around the V-portion of the device. The sliding support comprises a twin element collar, each twin element sliding along the exterior of a corresponding pipe track.

A hand crank is provided to rotate a pipe which forms the V-portion of the device, and elevating ropes are attached to the rotating pipe and to each end of the twin element collar. When the crank is turned, it will rotate the attached pipe, and this in turn will wind up the elevating ropes on the pipe and raise a bottle of water placed on the twin collar element, as it moves along the twin tracks. If the crank is released, the weight of the filled bottle of water (when it exceeds about ten pounds) will cause the collar to lock or wedge along the twin tracks, and prevent it from downward movement, and this represents an important safety feature.

When the bottle of water reaches the top of the twin tracks, the end of the track is elevated, the bottle is moved upwardly to the top of the dispenser, and it can then be easily moved horizontally to be inverted over the dispenser port where it remains until it is emptied.

DESCRIPTION OF THE PREFERRED EMBODIMENTS

Figure 2:
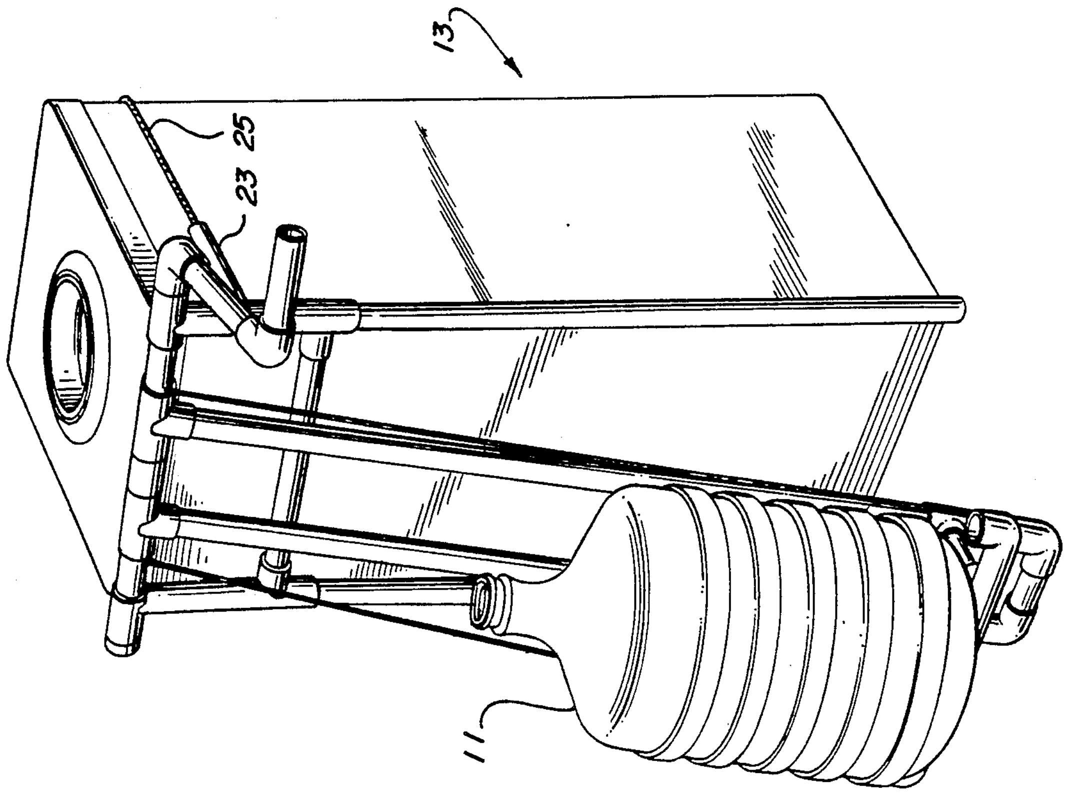
FIG. 2 is a perspective view of the device in conjunction with a water dispenser prior to elevating a bottle of water.
Figure 1:
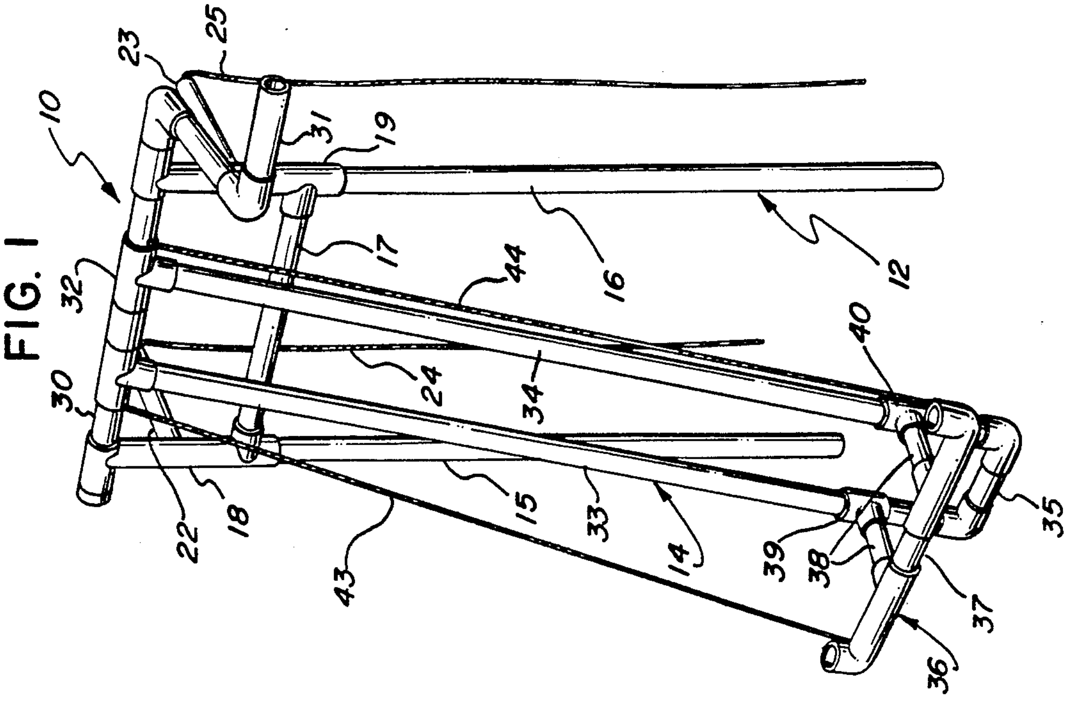
FIG. 1 is a perspective view of the device of this invention assembled and ready for use.

The device 10 for lifting a container of liquid 11 is shown assembled in FIGS. 1 and 2, and comprises a system of pipe elements constructed typically of plastic or aluminum. The device has an inverted V-shape, one side 12 of the device being disposed adjacent a water dispenser 13, and functioning as a support, and the other side 14 of the device functioning both as a support and as a slide system along which the bottle of water moves as it is raised to the top of the dispenser.

The support side 12 of the device comprises hollow plastic support pipe elements 15, 16 laterally reinforced by a horizontal pipe 17 attached to the pipe elements by collars 18 and 19. As shown in FIG. 2, securing elements 22, 23 are mounted on each collar 18 and 19 and are secured to the water dispenser 13 by cords 24 and 25, thereby stabilizing the device against the dispenser.

The ends of the collars 18, 19 are supported on a rotatable pipe 30 which forms the V-portion of the device, and a hand crank 31 attached to the pipe 30 will cause the pipe to rotate. Medially positioned on the rotatable pipe 30 is a rotatable collar 32 to which is attached twin slide tracks 33 and 34. The lower ends of the slide tracks are joined by a pipe reinforcement 35 which rests on the floor and supports the side 12 of the device.

At the lower end of the tracks is slidably mounted a twin element collar bracket 36 having a lateral support pipe 37 and parallel support pipes 38 which are attached thereto. Hollow sliding collar elements 39, 40 are attached to the support pipes 38, and the collars 39, 40 slide along the slide tracks 33, 34 respectively. Elevating ropes or cords 43 and 44 are attached to the lateral support pipe 37 and inwardly thereof, and these cords are attached at their other ends to the rotatable pipe 30.

Figure 4:
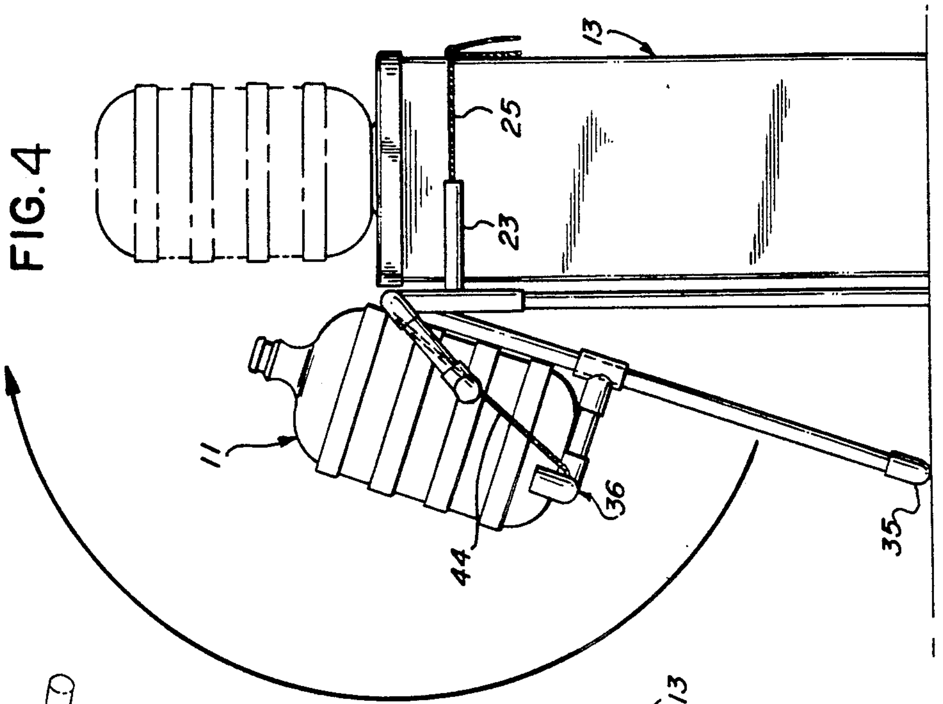
FIG. 4 is a perspective view of the device prior to elevating the bottom end of the twin pipe tracks to enable mounting the bottle of water in the dispenser.
Figure 3:
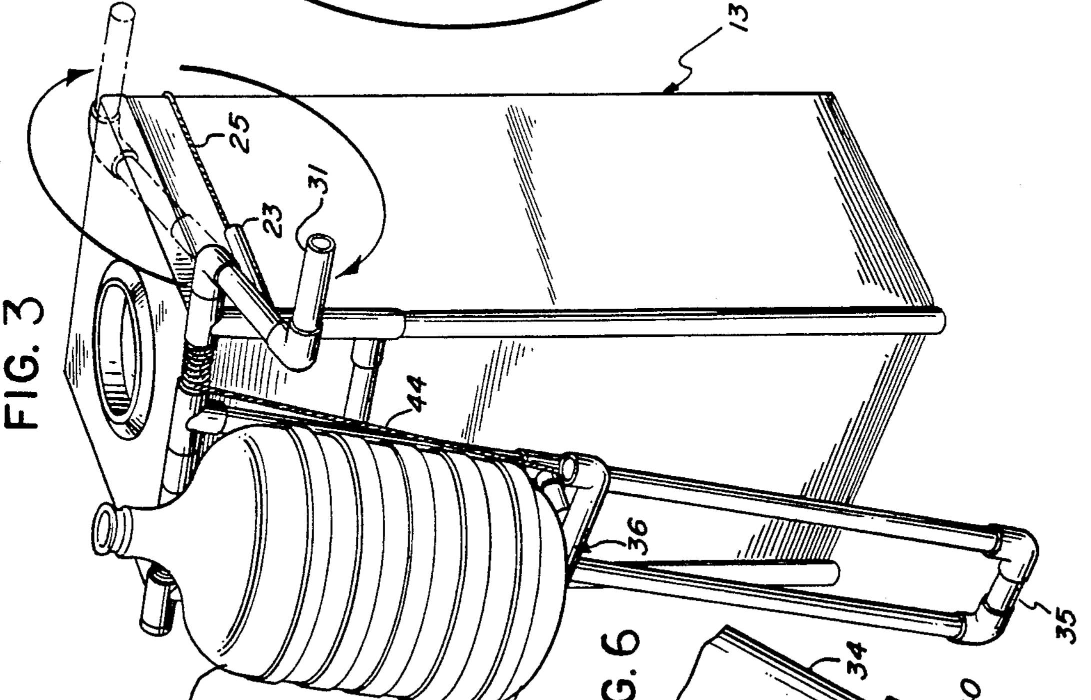
FIG. 3 is a perspective view of the device showing the bottle of water which has been elevated to the top of the water dispenser.

Hence, as shown in FIG. 3 when the hand crank 31 is turned, the cords 43, 44 will be wound up on the pipe 30 and raise the twin element collar bracket 36 along the twin slide tracks 33 and 34. In order to move the container from the track to the dispenser, the tracks 33, 34 are simply picked up at their ends (i.e., by lifting pipe reinforcement 35) and lifted in the direction of the arrow, as shown in FIG. 4. The container of liquid is then moved horizontally from the track and inserted into the dispenser.

Figure 5:
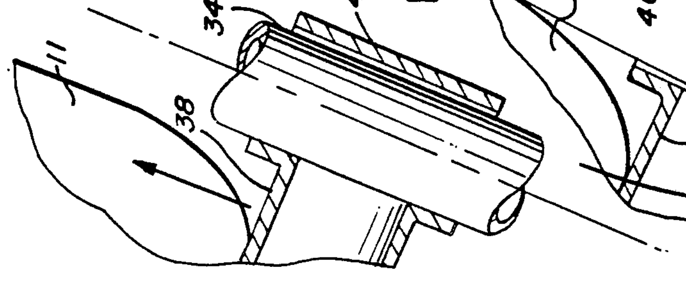
FIG. 5 is a sectional view in side elevation showing the fitting between the collar element and pipe tracks as the collar is moved upwardly along tracks; and, FIG. 6 is a sectional view in side elevation showing the wedging between the collar element and pipe tracks when the crank is released.
Figure 6:
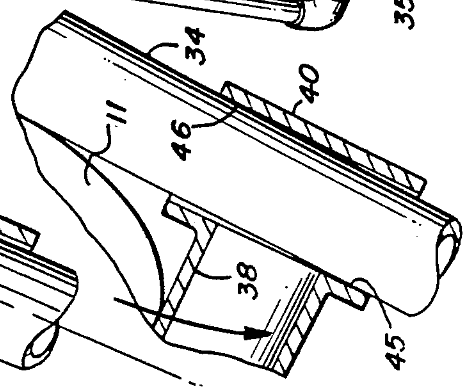

FIGS. 5 and 6 show the locking movement of bracket 36 as it moves along tracks 33 and 34. In FIG. 5, the container 11 and liquid are moved upwardly when the bracket 36 is wound upwardly by turning the hand crank 31. During this upward movement, the downward weight vector of the container and liquid on support pipe 37 is counterbalanced by the upward vector produced by the cords 43 and 44. This will incline collars 39 and 40 upwardly, and align the collars along the inclined tracks 33 and 34, thereby enabling the collar to freely move upwardly, without locking.

However, as shown in FIG. 6, when upward movement of the support pipe 37 ceases, the weight of the container and liquid will cause the support pipe 37 and collars 39, 40 to vector downwardly. Collar 40 then becomes misaligned and locks against the track 34 along interior areas 45 and 46; similarly, collar 39 will lock along track 33. Consequently, the weight of the container and liquid will not unwind the crank, and this represents an important safety feature. Typically, for a ¾" hollow standard pipe such as aluminum, or hollow plastic pipe such as pvc, polypropylene, etc., a minimum weight of about ten (10) pounds is required to produce the necessary vector forces for downward locking.

What is claimed is:

1. A device for lifting a water container to a top of a water cooler, comprising:

a.) an inverted, V-shaped frame element, comprising vertical, spaced-apart pipe elements abutting the water cooler;

b.) a horizontal pipe element portion of the frame element rotatably mounted between the vertical pipe elements, and positioned adjacent the top of the water cooler;

c.) a hand crank rotatably mounted at one end of the horizontal pipe element;

d.) an upwardly inclined, parallel track pair, defining upper ends rotatably mounted on the horizontal pipe element, and lower ends being spaced apart from the vertical pipe elements and the water cooler, the lower ends of the track pair being joined in spaced apart relationship by a pipe reinforcement;

c.) a twin element collar bracket providing twin collar elements slidably mounted along the track pair, outwardly directed, parallel support pipes separately mounted on the collar elements, and a lateral support mounted to the support pipes at each end thereof, the lateral support pipe being equidistant from the inclined track pair at each end thereof, the support pipes being adapted to support a container of water; and, d.) cord members defining upper and lower ends, the upper ends being attached to the horizontal pipe element, and spaced equidistant from each end of the horizontal pipe element, and the lower ends being attached to each end of the lateral support pipe; whereby:

i. during hand crank rotation, the cord members will be wound up around the horizontal pipe element;

ii. when the hand crank is rotated, the downward weight of the container of water positioned on the support pipes will incline the collar elements upwardly and align the collars along the inclined track pair, thereby enabling the container of water to be moved upwardly along the tracks;

iii. when the hand crank is motionless, the downward weight of the container of water will incline the collar elements downwardly, thereby misaligning the collar elements and locking them along the inclined track pair, thereby preventing downward movement of the collar bracket; and, iv. when the container and water have been raised along the track pair to the top of the water cooler by rotation of the hand crank, upward rotation of the track pair around the horizontal pipe element will enable the container to be moved off the track pair and along the top of the water cooler for positioning therein.

2. The lifting device of claim 1, comprising means to secure the device to the water cooler when the lifting device is in operation.

3. The lifting device of claim 1, including reinforcing means for securing the vertical pipe elements in spaced apart relationship.

4. The lifting device of claim 1, in which the lifting device is constructed of material selected from a class consisting of plastic and aluminum pipe.

* * * * *